United States Patent
Heino et al.

(10) Patent No.: US 6,221,962 B1
(45) Date of Patent: *Apr. 24, 2001

(54) LIQUID CRYSTAL POLYMER BLENDS, PROCESS FOR THE PREPARATION THEREOF AND PRODUCTS MANUFACTURED FROM THE BLENDS

(75) Inventors: Markku Heino, Espoo; Jukka Seppälä; Marjut Westman, both of Helsinki, all of (FI)

(73) Assignee: Neste Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,512

(22) Filed: Jan. 9, 1997

Related U.S. Application Data

(63) Continuation-in-part of application No. 08/341,620, filed on Nov. 17, 1994, now abandoned.

(30) Foreign Application Priority Data

May 29, 1992 (FI) .......................................................... 922520

(51) Int. Cl.$^7$ .......................... C08L 23/02; C08L 67/02; C08L 67/04
(52) U.S. Cl. ............................... 525/133; 525/64; 525/66; 525/67; 525/68
(58) Field of Search ............................... 525/68, 133, 64, 525/176, 66, 67

(56) References Cited

U.S. PATENT DOCUMENTS

| | | | |
|---|---|---|---|
| 5,134,194 | * | 7/1992 | Inoue ................................... 525/132 |
| 5,189,091 | * | 2/1993 | Laughner ............................. 525/133 |
| 5,262,473 | * | 11/1993 | Cottis ................................... 525/439 |
| 5,369,154 | * | 11/1994 | Laughner ............................. 525/133 |

FOREIGN PATENT DOCUMENTS

| | | |
|---|---|---|
| 0 369 734 A3 | 5/1990 | (EP) . |
| 0 380 112 A3 | 8/1990 | (EP) . |
| 0 406 979 A1 | 1/1991 | (EP) . |
| 61-60744 | * 3/1986 | (JP) . |
| WO 92/18568 | 10/1992 | (WO) . |

OTHER PUBLICATIONS

Chemical Abstracts vol. 115 No. 12 (1991), p. 41.
Injection–Moulded Blends of a Thermotropic Liquid Crystalline Polymer with Polyethylene Terephalate, Polypropylene, and Polyphenylene Sulfide by Heino et al, Journal of Applied Polymer Science, vol. 44, No. 6 (1992) pp. 1051–1060.
Extruded Blends of a Thermotropic Liquid Crystalline Polymer with Polyethylene Terephalate, Polypropylene, and Polyphenylene Sulfide by Heino et al, Journal of Applied Polymer Science, vol. 44, No. 12 (1992) pp. 2185–2195.

* cited by examiner

*Primary Examiner*—Patricia A. Short
(74) *Attorney, Agent, or Firm*—Cohen, Pontani, Lieberman, Pavane

(57) ABSTRACT

A polymer blend, a process for the preparation thereof and products manufactured from the polymer blend. The polymer blend contains 95 to 50 parts by weight of a polyolefin- or polyester-based polymer matrix, 5 to 50 parts by weight of an aromatic main-chain liquid crystalline polymer and plastic additives, if any. Further, the blend contains, based on the total weight of the previous components, 0.1 to 30 percent by weight of a substance (a compatibilizer) which improves the compatibility of the polymer matrix and the liquid crystalline component. The compatibilizer includes a polymer containing reactive functional groups. Preferably, the compatibilizer includes an SEBS polymer functionalized with maleic anhydride or an olefin polymer functionalized with glycidyl methacrylate.

17 Claims, 7 Drawing Sheets

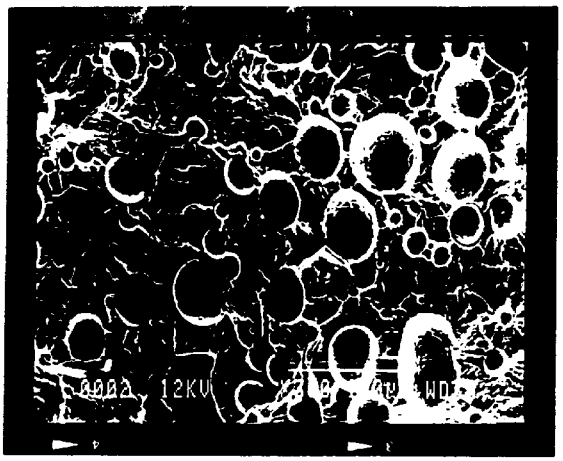
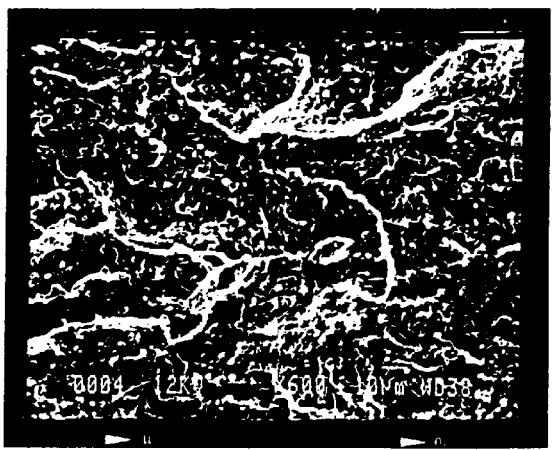
Fig. 1a　　　　Fig. 1b
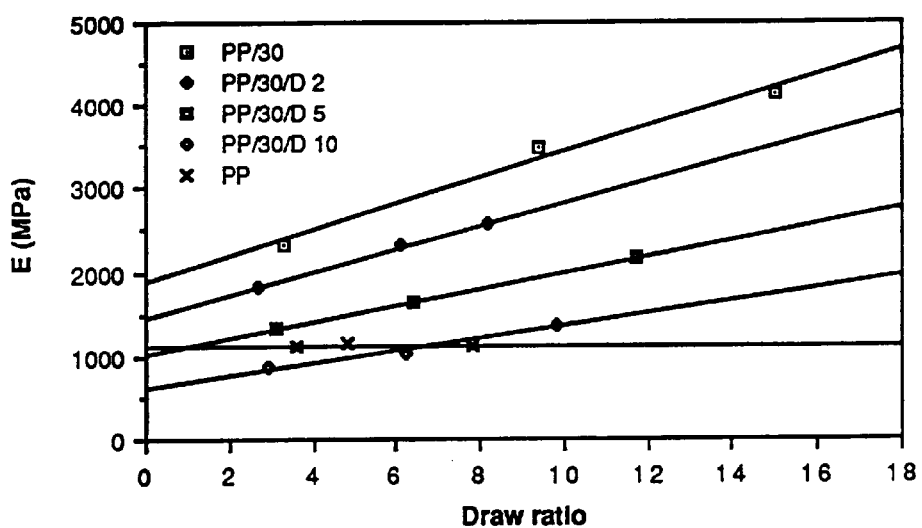
Fig. 2

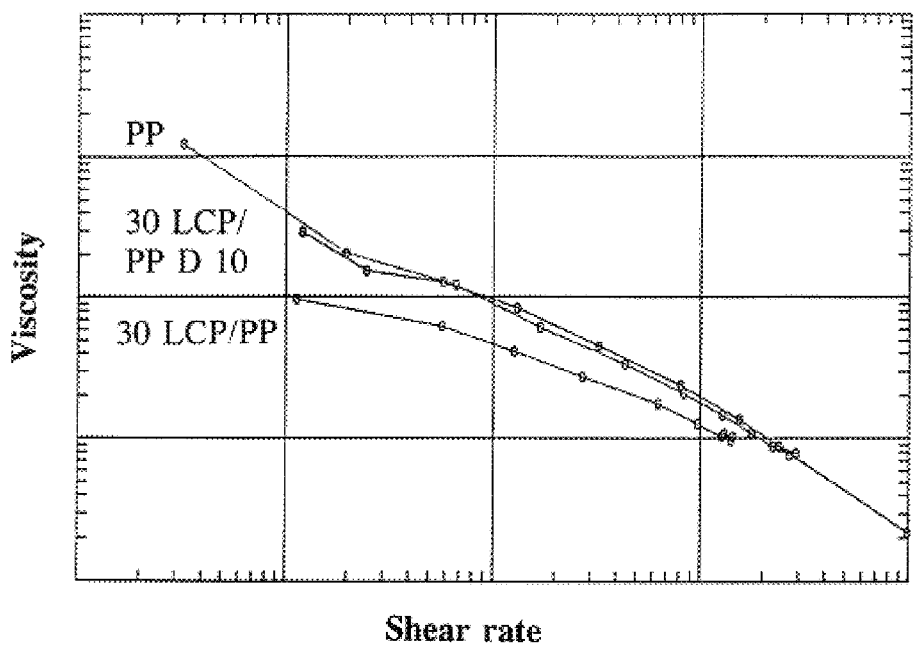
Fig. 3
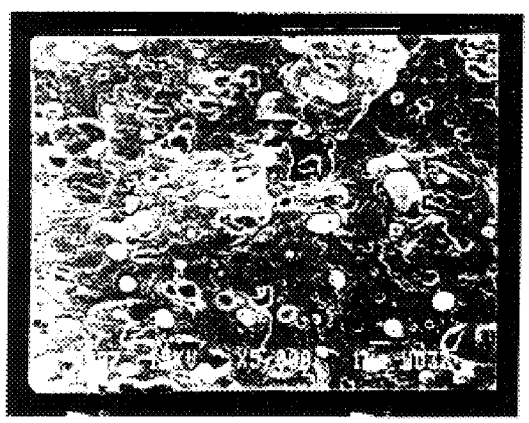 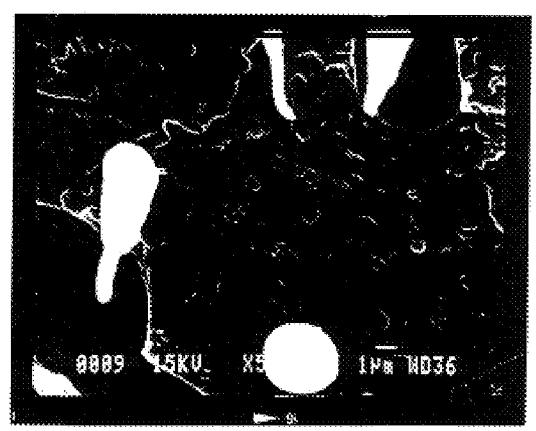
Fig. 4a        Fig. 4b

US 6,221,962 B1

LIQUID CRYSTAL POLYMER BLENDS, PROCESS FOR THE PREPARATION THEREOF AND PRODUCTS MANUFACTURED FROM THE BLENDS

This is a continuation-in-part, of application Ser. No. 08/341,620, filed Nov. 17, 1994, now abandoned.

BACKGROUND OF THE INVENTION

The present invention concerns a liquid crystalline blend.

This kind of a blend comprises a polymer matrix and a liquid crystalline polymer. The blend further contains a substance which enhances the compatibility of the polymer matrix and the liquid crystalline polymer.

The invention also relates to a process for preparing liquid crystalline polymer blends and to products which essentially consist of said polymer blends.

DISCUSSION OF THE PRIOR ART

Liquid crystalline polymers are polymers which in melt state lie between the boundaries of solid substances and liquids. The liquid crystalline structure is called a mesomorphic phase or an anisotropic phase because macroscopically in the melt state the liquid crystalline polymers are fluids. Microscopically they have a regular structure similar to that of crystals. The liquid crystalline polymers are called "thermotropic" if their anisotropy depends on the temperature only. The strength and stiffness of many thermoplastics can be substantially improved by blending them with thermotropic, main-chain liquid crystalline polymers. This is because the liquid crystalline polymers form fibres which orientate in the flow direction of the thermoplastic matrix melt. As a result there is an improvement of the mechanical properties, such as tensile strength and modulus of elasticity, of the thermoplastic in this direction. Often, the addition of the liquid crystalline polymer also improves the heat resistance and dimensional stability of the thermoplastics and makes it easier to process them.

The above-mentioned polymer blends are, however, hampered by the problem that their transversal properties, such as impact strength, are inferior to those of the corresponding unblended plastics. This phenomenon is due to the anisotropic structure and to the poor adhesion between the liquid crystalline polymer phase and the thermoplastic phase.

It is known in the art that the compatibility of liquid crystalline polymers and thermoplastics and that the impact strength of blends thereof can, to some extent, be improved by adding to the blends a third component, i.e. a substance known as a compatibilizer. The task of the compatibilizer is, for instance, to diminish surface tension between the phases, to improve adhesion, and to improve dispersion.

EP Published Patent Application No. 0 369 734 describes a polymer blend which consists of a poly(alkylene terephthalate) matrix, a polyacrylate-based liquid crystalline polymer and a substance which improves the impact strengths of the processed articles at low temperatures. According to the reference, the last-mentioned substance can be comprised of polyethylene, polypropylene, an ethylene-acrylic acid copolymer or a ethylene-propylenediene rubber.

A compatibilized blend of a liquid crystalline polymer and polycarbonate is disclosed in the EP Published Patent Application No. 0 380 112. The compatibilizer used in said reference consists of a polyolefin and/or olefinic copolymers. Among the olefinic copolymers, substances containing styrene monomers may be mentioned.

Common to both of the embodiments described in the references above is that the impact strength improvements of the polymer blends have been rather small.

SUMMARY OF THE INVENTION

The present invention aims at removing the problems relating to the prior art while providing liquid crystalline polymer blends of an entirely novel kind.

Our invention is based on the concept that the substance used for promoting the compatibility of the polymers comprises a polymer containing reactive functional groups. Surprisingly, it has been found that by adding polymers containing reactive groups to blends comprising thermoplastics and liquid crystalline polymers it is possible to provide polymer blends, with tensile and flexural strength properties which are better than the corresponding properties of the polymer matrix, while the impact strength remains at least reasonably good as far as practical applications are concerned. Thus, the impact strengths of the polymer blends according to the invention are at least 20% better than the impact strengths of corresponding uncompatibilized blends.

In particular, the blend according to the invention is mainly characterized by a compatibility promoting substance that consists of a polymer containing reactive functional groups. The tensile strength and flexural strength of the blend are as a result better than the corresponding properties of the matrix polymer. Additionally, the Charpy impact strength of the blend is at least 20% better than that of the corresponding uncompatibilized blend.

The process according to the invention is characterized by melt mixing 95 to 50 parts by weight of a polymer matrix, 5 to 50 parts by weight of a liquid crystalline polymer, and 0.1 to 30% by weight of functional polymer (calculated on the basis of the total amount of the matrix polymer and the liquid crystal and polymer) in order to form a compatibilized polymer blend, whose Charpy impact strength is at least 20% better than that of a corresponding uncompatibilized blend. Additionally the blend can be further subjected to additional processing.

For the purpose of this application the term "reactive compatibilizer containing functional groups" denotes a polymer which at least in principle is capable of reacting with at least one of the components of the blend. In practice it is difficult to determine the exact nature of the interaction between the compatibilizer and the other components of the blend, to ascertain whether a chemical reaction has taken place or not. Therefore, within the scope of the present application, all polymers which contain functional groups capable of reacting with the functional groups of the matrix polymer and/or the liquid crystalline polymer, are considered to be reactive compatibilizers. In blends containing polyolefins, the reactive, functional groups of a polymer working as a compatibilizer react (or interact in some other way) with the functional groups of the liquid crystalline polymer. Generally, the last-mentioned groups are comprised of the free terminal groups of the polymer chain. The polymer chain of the compatibilizer (e.g. its polyolefin residue) interacts,with the polyolefinic matrix without there necessarily being any chemical reaction. In blends containing polyesters, such as poly(ethylene terephthalate) (PET) and poly(butylene terephthalate) (PBT), and a liquid crystalline polymer, the compatibilizer may react both with the matrix and with the liquid crystalline polymer because PET, for instance, is not an entire inert polymer.

The functional groups of the compatibilizer comprise, for example, carboxy, anhydride, epoxy, oxazolino, hydroxy, isocyanate, acylacetam and carbodiimide groups.

The polymer residue of the compatibilizer can comprise co- and terpolymers, grafted polyolefins, grafted polystyrene and thermoplastic elastomers. The polar groups of polyolefinic copolymers are generally acrylic esters or functional acrylic acid groups. The polar groups of the terpolymers can be maleic anhydride groups, hydroxyl groups and epoxy groups, of which the last-mentioned are particularly preferred. The styrene block copolymers can consist of polystyrene segments and flexible elastomer segments. Typical styrene block copolymers are SBS (styrene/butadiene/styrene-copolymer), SIS (styrene/isoprene/styrene-copolymer) and SEBS (styrene/ethylene butylene/styrene-copolymer).

The compatibilizer used is selected depending on the other components of the liquid crystalline polymer blend. According to the present invention, particularly preferred compatibilizers are functional polyolefines or olefinic copolymers (including styrene), the functional groups preferably being epoxy, carboxy, amine or hydroxyl groups, in particular epoxy groups and glycidyl methacrylate groups. The portion of functional groups in the polymer is about 0.1 to 30%, preferably 1 to 10%.

"Liquid crystalline polymer blend" means a blend in which at least one thermoplastic has been blended with at least one liquid crystalline polymer. The blend further contains at least one of said compatibilizers and additives, if any. The blending of a liquid crystalline polymer with a thermoplastic gives rise to a blend whose viscosity generally is smaller than the viscosity of the thermoplastics. The blend of a liquid crystalline polymer and thermoplastics can also be called an "in situ" blend because the liquid crystalline polymer fibres are formed first during processing of the blend.

The plastic matrix stock of the polymer blend can comprise any suitable polymer material which has the desired properties as regards strength and processability. As examples of the matrix polymers, the following polymers may be mentioned: polyolefins such as polyethylene, polypropylene, polybutylene, polyisobutylene, poly(4-methyl-1-pentylene), including copolymers of ethylene and propylene (EPM, EPDM) and chlorinated and chlorosulphonated polyethylenes. The matrix polymer may also be comprised of the corresponding polyalkanes, which contain styrene, acryl, vinyl and fluoroethylene groups, and different polyesters, such as poly(ethylene terephthalate), poly(butylene terephthalate) and polycarbonate. Particularly preferred matrix polymers are the polyolefins and polyesters. In the example described below polypropylene and poly(ethylene terephthalate) have been used as matrix polymers. However, equally preferred are polyethylene and poly(butylene terephthalate). Together with a polypropylene matrix it is, according to the invention, particularly advantageous to use a ethylene-terpolymer having glycidyl methacrylate groups, and together with a poly(terephthalate ester) the same terpolymer or, alternatively, maleic anhydride grafted SEBS.

The liquid crystalline polymer may comprise an aromatic main chain thermotropic polymer, preferably a thermotropic polyester, poly(ester amide), poly(ester ether), poly(ester carbonate) or poly(ester imide). It can also comprise a copolymer of a polyester; such as a copolymer of poly(ethylene terephthalate) and hydroxy benzoic acid or a copolymer of hydroxynaphthoic acid and hydroxybenzoic acid. Generally, the liquid crystalline polymer can be defined as a polymer which is formed when the components of the following general formulas (or at least two of them) are reacted with each other: a dicarboxylic acid of formula HOOC—$R_1$—COOH, a diol of formula HO—$R_2$—OH, and a oxycarboxylic acid of formula HO—$R_3$—COOH, wherein $R_1$, $R_2$ and $R_3$ represent a bivalent aromatic hydrocarbon group, a group of formula $R_4$—X—$R_5$, wherein $R_4$ and $R_5$ represent a bivalent hydrocarbon group and X is an oxygen or a sulphur atom, a sulphonyl, carbonyl, alkylene, or ester group or X is a single bond, a xylylene group or a bivalent aliphatic hydrocarbon group. The liquid crystalline polymer can also comprise a homopolymer of an oxycarboxylic acid of formula HO—$R_3$—COOH.

As far as liquid crystalline polymers and their properties are concerned, reference is made to the article by Chung et al. in Handbook of Polymer Science and Technology, Vol. 2 (1989) 625–675.

Of the polymer blend additives, fillers, pigments and various substances which promote the processing of the blend can be mentioned.

In the liquid crystalline polymer blend the proportion of the liquid crystalline polymer may, in principle, vary within large ranges, depending on the effect which is sought to be achieved by the liquid crystalline polymer addition. Said proportion calculated on basis of the total amount of the matrix polymer, and the liquid crystalline polymer may vary in the range from 1 to 99%. By adding about 1 to 15 percent by weight of a liquid crystalline polymer to the matrix polymer a decrease of the viscosity is obtained which enhances the processing. By adding about 15 to 85 percent by weight self-enforcing plastics are provided, whereas an amount of 85 to 99 percent by weight will give rise to modified liquid crystalline polymers. According to a preferred embodiment liquid crystalline polymer blends are prepared, in which the amount of the liquid crystalline polymer lies in the range from about 5 to about 50 percent by weight, in particular about 10 to about 30 percent by weight of the total amount of the matrix polymer and the liquid crystalline polymer. The corresponding amount of the matrix polymer is preferably about 95 to about 50 percent by weight, in particular about 90 to about 70 percent by weight. Another preferred embodiment provides liquid crystalline polymer blends in which the amount of the liquid crystalline polymer is from 50 to 90 percent by weight and the amount of the matrix polymer is 50 to 5 percent by weight. The amount of the compatibilizer can vary in the range from about 0.1 to 30%, preferably it is about 1 to 15 percent by weight of the total weight of the matrix polymer and the liquid crystalline polymer. These relative amounts of the components will provide a reinforced plastic, in which the reinforcement is comprised of the liquid crystalline polymer.

Plastic additives known per se can be added to the polymer blend according to the invention. These additives comprise, for instance, stabilizers, colouring agents, lubricants, antistatic agents, fillers and fire retardants. If desired, these substances can be premixed with, e.g., the matrix polymer before forming the polymer blend. The amounts of polymer additives are typically about 0.01 to 5%, preferably about 0.1 to 2% of the weight of the polymer blend.

Of the liquid crystalline polymer blends according to the invention, the following are particularly preferred:

A. Polypropylene (PP) matrix, a copolymer of hydroxynaphthoic acid and hydroxybenzoic acid as a liquid crystalline polymer (LCP) and, as compatibilizer (comp. D), a ethylene-terpolymer, containing glycidyl methacrylate and epoxy groups. The following preferred blend compositions may be mentioned:

A1 about 70 parts by weight of PP, about 30 parts by weight of LCP and 5 to 10 percent by weight of comp. D (calculated on basis of the weight of PP and LCP)

A2 about 90 parts by weight of PP, about 10 parts by weight of LCP and 2 to 5 percent by weight of comp. D (calculated on basis of the total weight of PP and LCP), and A3 about 50 to 10 parts by weight of LDPE, HDPE or PP, about 50 to 90 parts of LCP and 2 to 15 percent of comp. D (calculated on basis of the total weight of PE and LCP).

B. Poly(ethylene terephthalate) (PET) matrix, otherwise the same components as under point A. The following example of the preferred blend compositions may be mentioned:

B1 about 90 parts by weight of PET, about 10 parts by weight of LCP and 2 to 5 percent by weight of comp. D (calculated on basis of the total weight of PET and LCP).

C. Poly(ethylene terephthalate) (PET) matrix, a copolymer of hydroxynaphthoic acid and hydroxybenzoic acid as a liquid crystalline polymer (LCP) and, as a compatibilizer (comp. A), maleic anhydride grafted SEBS. The following example of the preferred blend composition may be mentioned:

C1 about 90 parts by weight of PET, about 10 parts by weight of LCP and 5 to 10 percent by weight of comp. A (calculated on basis of the total weight of PET and LCP).

Particularly preferred matrix polymer/liquid crystalline polymer blends are represented by those having better tensile and flexural strengths than the matrix polymer and having at least 20% better impact strength than the uncompatibilized polymer blends. Thus, the Charpy impact strength of unnotched test samples prepared from blends according to the invention is typically over 30 kJ/m$^2$.

The thermoplastic/liquid crystalline polymer blends according to the invention can be prepared by methods known per se.

The mixing methods are either batch or continuous processes. As examples of typical batch mixers, the Banbury mixer and the heated roll mill may be mentioned. Continuous mixers are exemplified by, for instance, the Farrel mixer, and single- and double-screw extruders. Preferably single- or twin-screw extruders are used for blending the liquid crystalline polymer with the thermoplastic. The liquid crystalline polymers are blended with the thermoplastics either by first premixing the liquid crystalline polymers with the thermoplastics in a twin-screw extruder and then processing them in an injection moulding machine or, alternatively, by processing them by injection moulding or extrusion without premixing.

The blends according to the invention can be processed according to methods known per se in polymer technology to manufacture the final products. Thus, the blends can be used for preparing moulded articles, extruded products and thermoformed products. The moulded articles can be manufactured by, for instance, injection moulding or blow moulding. Fibres, films, pipes, profiles, cables and coatings may be mentioned as examples of extruded products.

Because, as mentioned above, the liquid crystalline polymer blends are "in situ" blends it is particularly preferred to process the blends by extrusion, LCP fibres being formed during extrusion, which improves the strength properties of the products in longitudinal direction. According to a preferred embodiment of the invention, extrusion is used to manufacture liquid crystalline polymer blends consisting of a polypropylene matrix.

By using rotating dies or similar methods it is possible to achieve not only longitudinal reinforcement of products prepared by extrusion but also transversal reinforcement. The biaxial orientation thus obtained is particularly preferred when liquid crystalline polymer blends are used for manufacturing certain products.

Considerable advantages are achieved by the polymer blends according to the invention and by their use for various applications.

Thus, it is possible to obtain a substantial improvement of the impact strength of liquid crystalline polymer blends by compatibilizer addition. Since, however, an increase of the compatibilizer portion at the same time to some extent impairs the longitudinal strength of the blends, as the is examples below show, it is preferred according to the invention to add only so much amounts of the compatibilizer that the tensile strength and the flexural strength of the blend still are better than the corresponding properties of the polymer matrix.

As an example of the improvement of the impact strength obtainable by the present invention, it may be mentioned that the Charpy impact strength of an injection moulded liquid crystalline/polypropylene blend (30/70) was three-folded when a small amount of ethylene based terpolymer was added. The melt flow viscosity of the blend was also slightly increased after the addition of the compatibilizer, which appears to indicate that the compatibilizer addition not only improves the impact strength but it also increases phase interaction. Following the compatibilizer addition, the size of the liquid crystalline polymer phases decreased, which indicates that the compatibilizers according to the invention increases dispersion.

Consisting only of thermoplastics, the reinforced plastics and the products prepared from them can be recirculated as such because they do not contain reinforcing fibres consisting of other materials, such as glass. The wear of the processing equipment is, for the same reason, diminished. Processability is improved and because there is not much thermal expansion, instrument parts requiring dimensional stability can be manufactured from the blends. Due to the small temperature coefficient, the blends are well suited for use as constructional materials for electrical and optical cables.

With reference to what is stated above, the present invention concerns, in particular, constructional parts of electrical and optical cables manufactured from the above-mentioned liquid crystalline polymer blends.

The blends can also be used for manufacturing injection moulded parts used in the electronics industry. Pipes and tubes made from the blends typically have good barrier properties, i.e. low permeability.

In the following the invention is described more closely with the help of a detailed description and non-limiting working examples. In the working examples reference is made to the attached drawings, of which

BRIEF DESCRIPTION OF THE DRAWINGS

FIG. 1 shows a SEM micrograph of the cross section of a PP/30 wt.-% LCP blend prepared in a Brabender-melt mixer, a) without any compatibilizer and b) with 7 wt.-% of compatibilizer D, D), FIG. 2 shows the modulus of elasticity as a function of the draw ratio for extruded blends of PP/LCP/compatibilizer D, FIG. 3 shows the melt viscosities for PP, PP/LCP (70/30) and PP/LCP(70/30)/10 wt.-% of compatibilizer D blends as a function of the shear rate at 290° C., FIG. 4 shows SEM micrographs of the cross section of a) a PP/EPDM (75/25) compound and b) PP/18% EPDM/30% LCP blend, FIG. 5 indicates the influence of compatibilizers on the Charpy impact strength of a PET/LCP 10 blend, FIG. 6 indicates the influence of compatibilizers on the flexural strength of a PET/LCP 10 blend, FIG. 7 indicates the influence of compatibilizers on the maximum tensile strength of a PET/LCP 10 blend.

MANUFACTURING PROCESS

1. General

Figure 5:
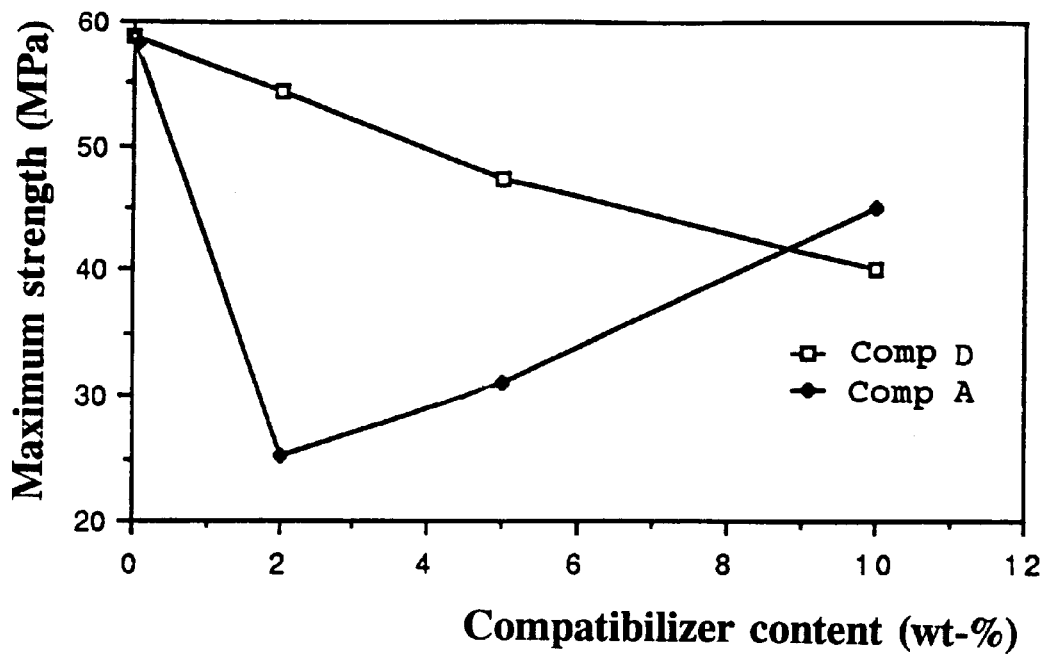

Thermotropic main-chain liquid crystalline polymer (LCP) was blended with thermoplastics, the amount of the LCP being 10 to 30 percent by weight of the weight of the blend (without the compatibilizer). In order to improve the compatibility of the components of the blend, small amounts of different compatibilizers were added to the LCP/thermoplastic blends. The blend processed in a twin-screw extruder were injection moulded to test samples whose mechanical and thermal properties as well as morphology and rheology were tested.

Example 4 discloses a new way of preparing compatibilized liquid crystalline polymer blends according to which embodiment the compatibilizer is first preblended with the liquid crystalline polymer, the thermoplastic being added in the second stage of the process. By the process an improved interaction between the compatibilizer and the LCP is achieved.

2. Materials

The liquid crystalline polymer used included a PHB/HNA based aromatic copolymer marketed under the trade name Vectra A 950. This product is supplied by Hoechst Celanese and its density is 1.40 g/cm$^3$, melting point 280° C., tensile strength 165 MPa, elastic modulus 9700 MPa, and elongation at break 3.0%. It consists of a copolymer of hydroxynaphthoic acid and p-hydroxybenzoic acid. Further LCP's used comprised Optimide λ, an amorphous poly(ester imide) from OPTATECH, Finland, Rodrun 3000, a crystalline polyester LCP from Unitika, Japan, and Vectra B950, a crystalline poly(ester amide) LCP from Hoechst-Celanese, U.S.A.

Homopolymer VB 19 50K supplied by Neste Oy was used as polypropylene, and the crystallizing product Arnite D04 300 supplied by AKZO as poly(ethylene terephthalate).

Further polyolefins used comprised LE 1515 LDPE, NCPE 7004 HDPE and VB 6512 H PP, all of which were obtained from Borealis, Denmark.

The compatibilizer used comprised a reactive ethylene-based terpolymer (compatibilizer D) marketed under the name Lotader (AX 8900). The polymer is supplied by Atochem, France. The product contains about 30 percent by weight of ethyl acrylate, 62 percent by weight of ethene, and 8 percent by weight of glycidyl methacrylate having reactive epoxy groups. The other reactive compatibilizer used comprised maleic anhydride grafted SEBS with an acid content of 1.8 percent by weight (compatibilizer A). The product is supplied by Shell under the name Kraton FG 1901 X. NCPE 0420, a maleic anhydride grafted EBA from Borealis, Denmark, was also used. The afore-mentioned compatibilizers were added in amounts of 2 to 10 percent by weight of the amount of the thermoplastic and LCP blend.

In the reference test, an improvement of the impact strength of PP/LCP blends were attempted by adding non-functional EPDM rubber (Keltan 778 DSM) to the blend and by blending LCP with a PP/EPDM (75/25) compound (DE 2561 Neste). Also non-functional SEBS polymer was used.

3. Blending

Before the melt blending stage the materials were first manually mixed with the matrix thermoplastics as dry pellets.

The mixed polymer pellets were then dried. The drying conditions for the blends were chosen according to the matrix polymers and were normally at least 2 hours at 70° C.

The melt blending of the materials was performed by a Berstorff ZE 25×33D co-rotating twin-screw extruder at temperatures ranging from 285 to 290° C. (the temperature of the molten polymer was about 290 to 295° C.) and with a screw speed of 150 rpm. The extrudate was immediately quenched in a water bath and pelletized again.

4. Injection moulding

The blends as well as the pure polymers were dried as described above and injection moulded into the form of test specimens. Pure thermoplastic polymers were processed at typical conditions (the polypropylenes at about 210 to 230° C.). The blends were injection moulded at about 280 to 290° C.

5. Extrusion

Some blends were extruded to strands with a Brabender Plasti-Corder PLE 651 laboratory single screw extruder connected after the water basin to a belt capstan. The extrudate was drawn at different speeds to give a picture of the influence of the draw ratio on the properties of the strand (LCP orientation). The draw ratio for each strand was determined as the ratio between the die and the strand cross-sections. The cylinder temperatures of the extruder were 280 to 285° C. The diameter (D) of the round hole capillary die was 5 mm and the capillary length (L) 30 mm, thus the L/D ratio was 6. The speed of the belt capstan ranged from 10 to 40 m/min.

The twin screw extruders used comprised a Brabender DSK 42/7 counterrotating twin-screw extruder and a co-rotating twin-screw miniextruder ZE20, 11.5 D. The temperature was maintained at about 230 to 290° C. with a screw speed of about 75 rpm.

Characterization of the Blends

Before testing, all samples were conditioned applying ISO 291 at test room conditions (about 23° C. and 50% relative humidity) for at least 88 hours.

1. Mechanical properties

The mechanical properties of the blends were assessed by testing the blends for tensile strength, flexural strength and impact strength.

Tensile properties were measured according to ISO 527. Flexural properties were studied with the same equipment according to ISO 178 as a three-point-bending test. Charpy impact strength was determined of unnotched test specimens according to ISO 179 by using a Zwick 5102 pendulum type testing machine. A pendulum of 40 kpcm was used.

2. Other properties

The morphology of the blend samples was investigated with a scanning electron microscope (SEM).

The rheology of the polymers was investigated by measuring their melt viscosities in shear flow. The measuring temperature was 290° C. and the L/D ratio of the die was 20 mm/0.5 mm. Bagley correction was not done but the results include Rabinowitch correction.

EXAMPLE 1

Compatibilized PP/LCP Blends

Polymer blends were prepared from PP homopolymer and LCP, and 2 to 10 percent by weight of a reactive ethylene based terpolymer (comp. D) was added to the blends. Processing, injection moulding and testing of the blends were carried out as described above.

The results obtained are indicated in Table 1. The abbreviations used in the table, for instance PP/20/D 3, relate to the compositions of the liquid crystalline polymer blend compositions, PP/20/D 3 indicating that the relation between PP and LCP in the blend amounts to 80:20 and there is 3 percent of substance D calculated on basis of the total weight of the PP and the LCP.

and flexural properties were obtained than for the polymer matrix as such.

is The micrographs (FIGS. 1a and 1b) show that the compatibilizer also has a strong dispersive effect.

For extruded PP/LCP blends better tensile strengths were obtained when the draw ratio increased because the LCP phases were subjected to deformation, upon which they formed fibres. This fact is evidenced by FIG. 2.

Viscosity measurements show that the addition of LCP diminishes the melt viscosity of thermoplastics (such as polypropylene in this Example). In spite of its small viscosity, compatibilizer D increases the viscosity of the blend towards the polypropylene level (FIG. 3). This suggests an increased interaction between the blend components (possibly a chemical reaction).

TABLE 1

Mechanical properties of injection moulded compatibilized PP/LCP blends

| Material | TENSILE PROPERTIES E (MPa)/σ (MPa)/ε (%) | FLEXURAL PROPERTIES E (MPa)/σ (MPa) | IMPACT STRENGTH Charpy (kJ/m$^2$) |
|---|---|---|---|
| PP | 1047/24.0/>100 | 964/29.6 | not broken |
| PP (2-screw extr. | 1174/26.0/>100 | 1080/33.5 | not broken |
| PP/30 | 2365/33.0/2.6 | 2487/47.6 | 9.2 |
| PP/30/D 2 | 1895/31.1/4.7 | 2001/46.5 | 11.3 |
| PP/30/D 5 | 1466/26.0/8.4 | 1324/36.0 | 30.7 |
| PP/30/D 10 | 1192/22.6/12.2 | 1044/30.5 | 44.6 |
| PP/20 | 1634/29.5/6.8 | 1621/40.4 | 17.1 |
| PP/20/D 3 | 1264/25.2/>100 | 1302/35.4 | (54.4) * not all broken! |
| PP/20/D 7 | 962/21.0/>100 | 878/27.0 | not broken |

E (MPa) = elastic modulus;
σ (MPa) = maximal strength;
ε (%) stain at break

It appears from the table that the impact strength of the blends are greatly improved by the addition of the compatibilizer. The impact strength of blend PP/30/D 2 is over 22% better than that of the corresponding non-compatibilized. Even greater improvements were obtained with blends PP/30 D 5 and PP/30 D 10. Although the tensile and flexural strengths and thus also the moduli of elasticity of the blends were to some extent impaired by high compatibilizer concentrations, by a moderate dosage (5 wt.-% of the compatibilizer at the most), while maintaining a good impact strength level (i.e. Charpy>30 kJ/m$^2$), better strength

EXAMPLE 2

Comparison

An attempt was made to improve the impact strength of PP/LCP blends with the help of a non-functional terpolymer. According to a first embodiment, LCP was blended into a PP/EPDM (75/25) compound and, according to a second embodiment, 5, 10, and 20 wt.-% of EPDM were added to PP/30 wt.-% LCP blends. The blends were processed, injection moulded, and tested as described above. The test results are given in Table 2.

TABLE 2

Mechanical properties of injection moulded PP/LCP/EPDM blends

| Material | TENSILE PROPERTIES E (MPa)/σ (MPa)/ε (%) | FLEXURAL PROPERTIES E (MPa)/σ (MPa) | IMPACT STRENGTH Charpy (kJ/m$^2$) |
|---|---|---|---|
| PP | 1047/24.0/>100 | 964/29.6 | not broken |
| PP/20 | 1634/29.5/6.8 | 1621/40.4 | 17.1 |
| PP/30 | 2365/33.0/2.6 | 2487/47.6 | 9.2 |
| PP/LCP/EPDM blends: | | | |
| PP/30/EPDM 5 | 2385/30.9/3.1 | 2549/42.4 | 8.3 |
| PP/30/EPDM 10 | 2151/28.2/3.2 | 2415/39.8 | 8.4 |
| PP/30/EPDM 20 | 1796/22.1/6.7 | 1778/29.5 | 12.1 |
| PP/EPDM (75/25) compound + LCP: | | | |
| PP-comp. | 627/12.4/>110 | 622/17.0 | not broken |

TABLE 2-continued

Mechanical properties of injection moulded PP/LCP/EPDM blends

| Material | TENSILE PROPERTIES E (MPa)/σ (MPa)/ε (%) | FLEXURAL PROPERTIES E (MPa)/σ (MPa) | IMPACT STRENGTH Charpy (kJ/m$^2$) |
|---|---|---|---|
| PP-comp./30 | 2013/26.4/2.5 | 2157/33.4 | 8.7 |
| PP-com./PP//30 (50/50) | 2149/31.8/2.7 | 2574/41.3 | 8.5 |

E (MPa) = elastic modulus;
σ (MPa) = maximal strength;
ε (%) stain at break

As apparent from the table an increase of the amount of the soft EPDM rubber caused a further slight weakening of the tensile and flexural strength properties of the blends. The impact strength of the blends did not, however, improve as expected. The micrographs indicate a smooth dispersion of the small rubber particles (0.5 to 1 mm) into the PP matrix. The non-functional rubber particles are not located on the interfaces between the LCP and PP phases, which means that the necessary interaction between the phases was not achieved.

This strengthens the basic concept that the activity of the rubber compatibilizer (D) is specifically based on a chemical reaction, because a similar effect is not obtained with rubber only.

EXAMPLE 3

Compatibilized PET/LCP Blends

Polymer blends were prepared from a PET polymer and LCP and 2, 5, and 10 wt.-% of reactive ethylene-based terpolymers (comp. D) or maleic acid grafted SEBS block copolymer (comp. A). The preparation of the blends, the injection moulding, and the testing thereof were carried out as described above.

Figure 6:
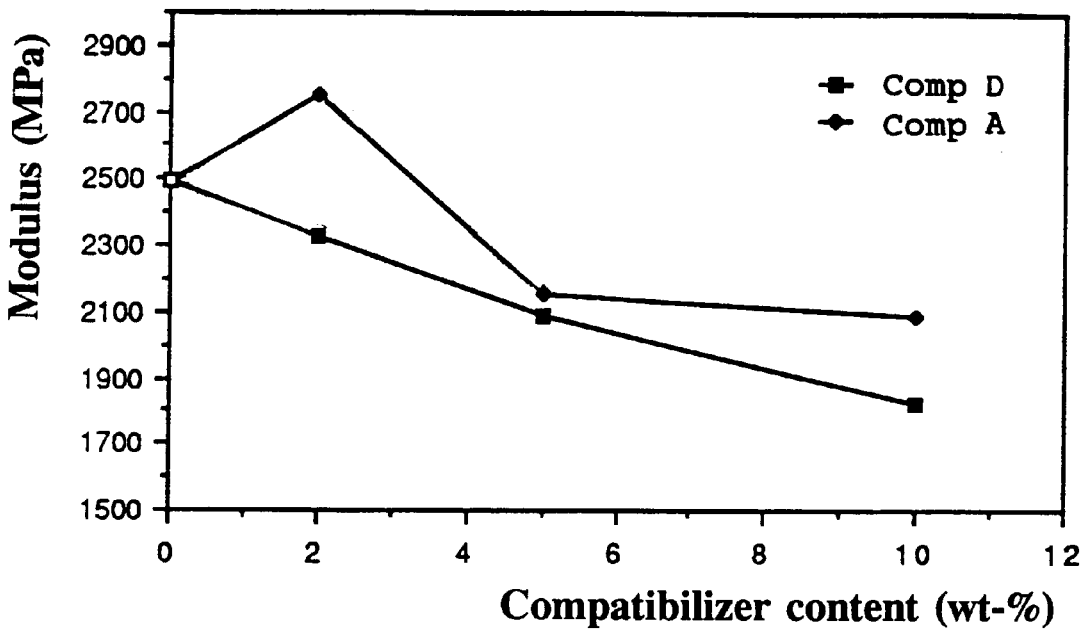
Figure 7:
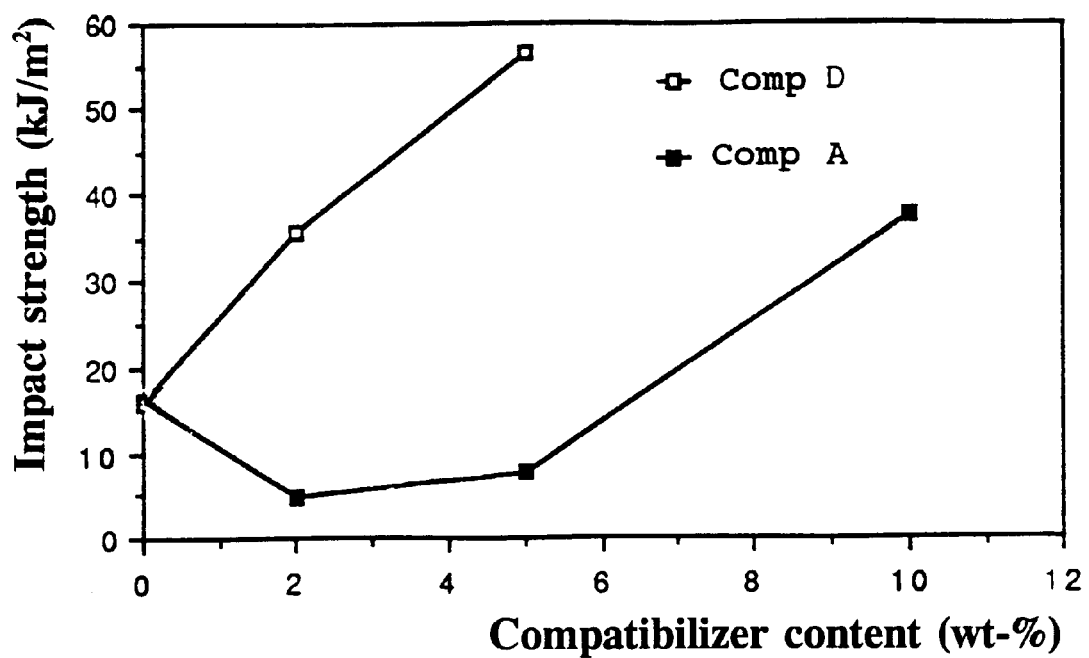

The results are shown in FIGS. 5 to 7.

FIG. 5 shows that the impact strength of the PET/LCP 10 blend was increased with both compatibilizers. Already at a 2 wt.-% terpolymer addition a clear increase in the impact strength could be noticed, and after a 5 wt.-% terpolymer addition only half of the test bars were broken. The impact strengths of these bars were 3.5 times greater than the strengths of uncompatibilized samples. By a 10 wt.-% additionally the impact strength was raised to the same level as the impact strength of the matrix polymer. Also at a 10 wt.-% block copolymer addition only half of the test bars were broken. The impact strength of these bars was 2.4 times greater than that of uncompatibilized samples.

The changes in the flexural and tensile strengths subject to compatiblizer additions are shown in FIGS. 6 and 7.

Surprisingly, it can be noted that during tensile and flexural tests the moduli of elasticity of the blends were clearly better than the corresponding values of the polymer matrix at a 2% terpolymer addition. Because the impact strength at the same addition amount was about 35 kJ/m$^2$, a rather advantageous polymer blend was obtained with this compatibilizer addition.

EXAMPLE 4

Binary Blends of LCP and Compatibilizers
A. Preparation

Binary blends of LCP and some compatibilizers were made in order to characterize the interactions between the compatibilizers and the LCP. In addition, a novel way of blending was also studied by preblending the compatibilizer and LCP first, and by adding the thermoplastics later in a second blending stage. The idea was to give the compatibilizer a better possibility to interact with the LCP.

The following binary blends were first made:
B1. PP/Comp. D (80/20)
B2. Vectra A950/Comp. D (80/20)
B3. Vectra A950/Comp. A (80/20)
and in the second stage polypropylene (PP) and/or poly (ethylene terephthalate) (PET) were added to blends B2 and B3, such that blends were provided having 30 percent by weight of the LCP and 5 to 7.5 percent by weight of the compatibilizer.

B2PP Vectra A950/Comp. D (80/20)+PP (VB1950K)
B2PET Vectra A950/Comp. D (80/20)+PET (Arnite D04300)
B3PET Vectra A950/Comp. A (80/20)+PET (Arnite D04300)

The melt blending was carried out with a DSK 42/7 counter-rotating twin-screw extruder at about 290° C. (230° C. for B1) with a screw speed of 75 rpm. After drying, the blends were injection moulded to form test specimens for testing of mechanical properties.

The results were compared to those of the blends having similar compositions but being prepared in the traditional way by first mixing all three components and then blending them in the extruder.

It should be emphasized that the counter-rotating twin-screw extruder used for the binary blends is not so good mixing equipment as the co-rotating one used for the blends described in the previous examples.

B. Morphology and Rheology of the Binary Blends

Figure 8A:
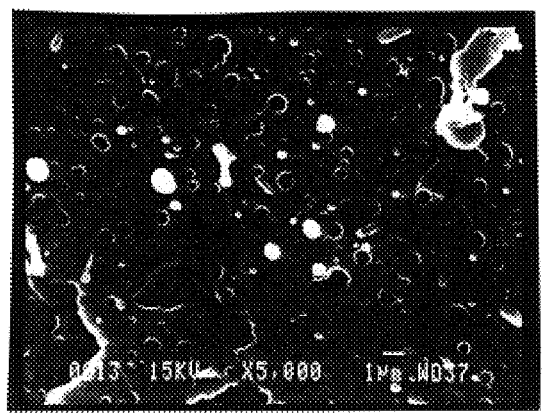
FIG. 8 shows SEM micrographs of binary blends of LCP and compatibilizers: a) PP/compatibilizer D, b) LCP and compatibilizer D, and c) LCP and compatibilizer A.
Figure 8B:
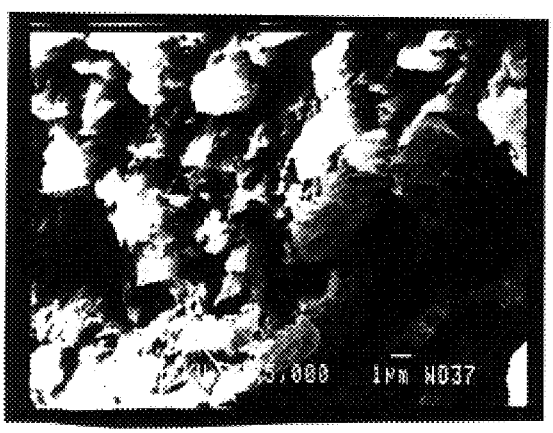
Figure 9:
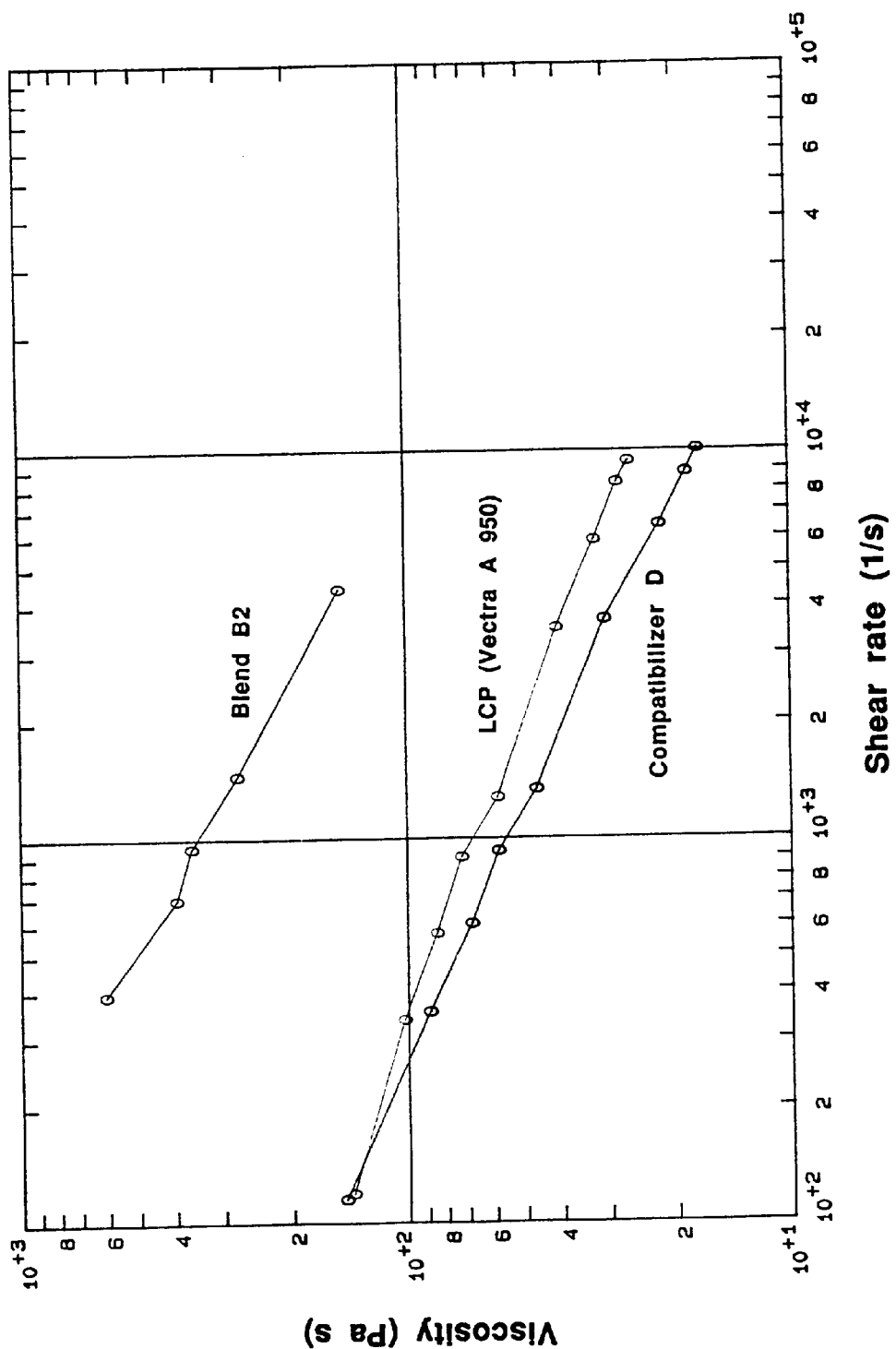
FIG. 9 illustrates the influence of the compatibilizer on the melt viscosity of a binary LCP blend.

Compatibilizer D was dispersed in the PP phase as fine droplets of the order of less than 1 μm (FIG. 8a). Partly because of the large proportion of the LCP, the binary blend of comp. D and LCP exhibited a fibrous structure. The compatibilizer could not be seen as a separate phase on the micrographs, and it is possile that it reacted so well with the LCP that it did not form a separate phase (FIG. 8b). Compatibilizer D raised the melt viscosity of the LCP to a clearly higher level (FIG. 9) which seems to indicate a chemical reaction between the compatibilizer and LCP as suggested also in earlier examples. On the other hand the addition of Comp. D to PP (blend B1) did not have any influence on the melt viscosity of PP. Thus, the effectiveness of compatibilizer D in compatibilization of LCP and PP is based on good mixing of comp. D in the PP matrix and chemical reactivity with the LCP.

Figure 8C:
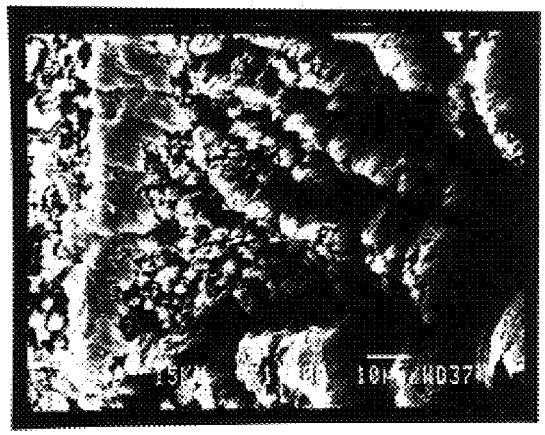
Figure 8D:

The blend LCP/Comp. A was also extremely fibrous due to the high amount of LCP, and its structure was possibly more reminiscent of a LCP (FIG. 8c). However, the viscosity of the LCP did not increase at all after addition of comp. A, which means that there was not a same kind of interaction between A and the LCP as between D and the LCP.
C. Compatibilized Blends of LCP/PET and LCP/PP
Mechanical Properties and Morphology Both compatibilizers (A and D) improved the flexural properties of LCP/PET blends as seen in Table 3.

TABLE 3

Elastic modulus (E), strength (σ) and displacement at yield (εδ) (three-point-bending, 5 mm/min).

| Material | E (MPa) | σ (MPa) | εδ (mm) | |
|---|---|---|---|---|
| PET | 2346 | 77 | 8.3 | |
| PET/30 | 3009 | 83 | —* | *not measured |
| B2PET | 4103 | 91 | 7.7 | (PET/30 LCP/5.0 D) |
| B3PET | 3673 | 86 | 8.1 | (PET/30 LCP/7.5 A) |

Figure 10A:
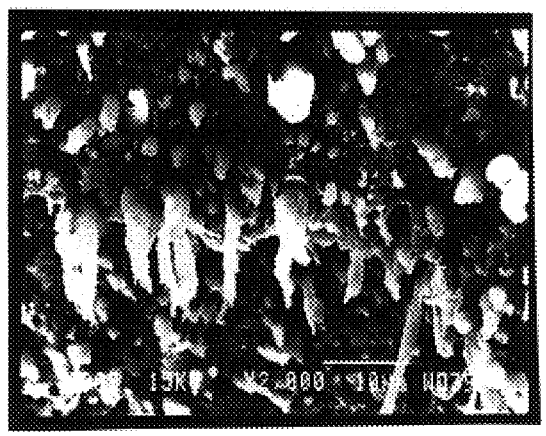
FIG. 10 shows SEM micrographs of cross sections of extruded strands made from compatibilized polymer blends: a) PET/30% LCP/5% comp. D, b) PET/30% LCP/7.5% comp. A and c) PP/30% LCP/5% comp. D.
Figure 10B:
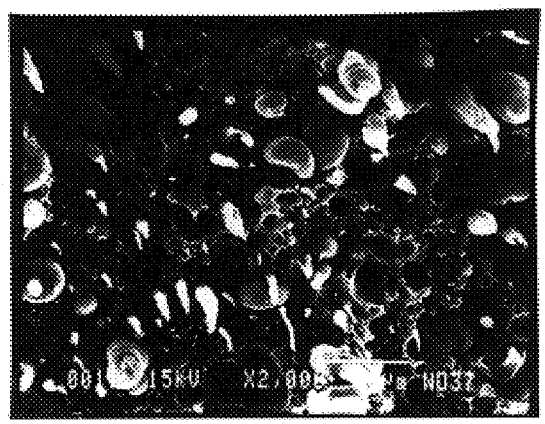

Morphology of the extruded blends is presented by SEM micrographs in FIG. 10. Blend B2PET exhibited a highly fibrillar structure throughout the sample, which explains the high level of strength and stiffness, while B3PET contained deformed LCP domains but less fibres than B2PET. In addition, the LCP domains (fibres) were better attached to the PET matrix and the fibre surfaces were not so smooth in B2PET due to the more reactive compatibilizer.

Tensile and impact strength properties of PP/LCP blends are shown in Table 4. Significant improvement in impact strength was achieved again by compatibilizer D, while the values of strength and modulus were slightly decreased in comparison to the uncompatibilized blend. The impact strength of B2PP was also better than that of the similar blend composition prepared in the traditional way (PP/30/D5 in Table 1).

Thus preblending of LCP and the compatibilizer before the addition of the thermoplastic matrix polymer may be advantageous for the resultant blend properties.

TABLE 4

Tensile and impact properties of PP/LCP blends.

| Material | E (MPa) | σ (MPa) | ε (%) | Charpy Impact Strength (kJ/m$^2$) |
|---|---|---|---|---|
| PP | 1047 | 24 | >100 | not broken |
| PP/30 | 2365 | 33 | 2.5 | 9.2 |
| B2PP* | 1332 | 26 | 5.9 | 39.2 |

*PP/30% LCP/5% comp. D

Figure 10C:
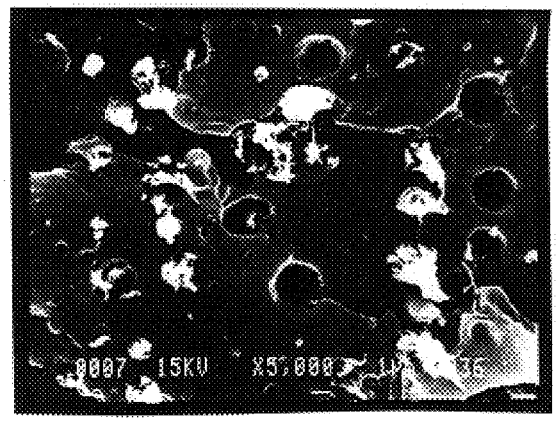

In the blend B2PP LCP formed fiber-like domains which were rather well attached to the matrix as seen in FIG. 10c.

EXAMPLE 5

Compounding

With a corotating twin-screw miniextruder ZE 20, 11.5 D blends of 70 wt. % LCP and 30 wt. % of polyolefin (optionally including a compatibilizer) were made at a screw rotation speed of 220 RPM which caused a production rate of 600 g/h and a residence time of 90 s. The temperature profiles were: 260° C./260° C. for Optimide λ, an amorphous polyesteramide LCP from OPTATECH, Finland; 280° C./285° C. for Rodrun 3000 a crystalline polyester LCP from Unitika, Japan; and 290° C./295° C. for Vectra B 950, a crystalline polyesteramide LPC from Hoechst-Celanese U.S.A. The polyolefins were LE 1515 LDPE, NCPE 7004 HDPE and VB 6512 H PP all of which were obtained from Borealis, Denmark. The compatibilizers were Lothader AX 8900, an ethylene-ethylacrylate-glycidimethacrylate terpolymer from Atochem, France and NCPE 0420, a maleic anhydride grafted EBA from Borealis, Denmark.

EXAMPLE 6

Evaluation of Compatibilization Performance

The testing was done by measuring the impact resistance according to the Notched Charpy method (ISO 179 /1A, 1D). The testing bars were injection moulded: melt temperature 300° C. for LDPE and HDPE and 240° C. for PP; mold temperature 40° C.; injection pressure 3 bar; after pressure 1.5 bar: cooling time 20 s.

EXAMPLE 7

| Recipe | Notched Charpy (kJ/m$^2$) |
|---|---|
| Optimide λ | 7.2 |
| Optimide λ + LDPE | 1.8 |
| Optimide λ + LDPB + 5% Lothader AX 8900 | 2.6 |
| Optimide λ + LDPE + 10% Lothader AX 8900 | 3.4 |
| Optimide λ + LDPE + 10% NCPE 0420 | 3.0 |

EXAMPLE 8

| Recipe | Notched Charpy (kJ/m$^2$) |
|---|---|
| Optimide λ + HDPE | 1.6 |
| Optimide λ + HDPE + 10% Lothader AX 8900 | 3.1 |
| Optimide λ + PP | 1.9 |
| Optimide λ + PP + 10% Lothader AX 8900 | 3.0 |

EXAMPLE 9

| Recipe | Notched Charpy (kJ/m$^2$) |
|---|---|
| Rodrun 3000 | 60.3 |
| Rodrun 3000 + LDPE | 11.3 |
| Rodrun 3000 + LDPE + 10% NCPB 420 | 20.0 |
| Vectra B 950 | 28.0 |
| Vectra B 950 + LDPE | 4.8 |
| Vectra B 950 + LDPE + 10% NCPE 420 | 7.6 |

It can be seen from Examples 5–9 that one can make compounds of LCP and polyolefins with LCP in majority forming the continuous phase and that functional polyolefins can improve their compatibility as demonstrated by their Notched Charpy impact properties. For all polyolefins, LDPE, HDPE and PP, the Notched Charpy impact of their LCP-blends decreased compared to neat LCP but could be improved by adding small amounts of functional polyolefins as compatibilizer.

In summary, in Examples 5–9, the polymer compounds contain 70 wt % LCP and 30 wt % polyolefin and 5 to 10% (calculated from the weight of the other components) compatibilizer. The compatibilizer is either an ethylene-ethylacrylate-glycidylmethacrylate terpolymer or a maleic anhydride grated EBA.

What is claimed is:

1. A polymer blend comprising:
   a matrix polymer selected from the group consisting of poly(ethylene terephthalate), poly(butylene terephthalate), polypropylene or polyethylene;

1 to 99 wt.-% of a liquid crystalline polymer wherein the liquid crystalline polymer comprises a polyester; and 0.1 to 30 wt.-% of a compatibilizer substance promoting the compatibility of the matrix polymer and the liquid crystalline polymer, the amount of the liquid crystalline polymer and the compatibilizer being calculated on the basis of the total amount of the matrix polymer and the liquid crystalline polymer, wherein the compatibility promoting substance is a reactive ethylene based terpolymer containing reactive epoxy groups, and the tensile strength and flexural strength of the blend are greater than the corresponding properties of the matrix polymer, and the Charpy impact strength of the polymer blend is at least 20% greater than that of the corresponding uncompatibilized blend.

2. The polymer blend of claim 1 wherein the polymer matrix comprises poly(ethylene terephthalate), and the liquid crystalline polymer is a copolymer of hydroxynaphthoic acid and hydroxybenzoic acid and the compatibilizer comprises an ethylene terpolymer with glycidyl methacrylate groups and epoxy groups as reactive groups.

3. The polymer blend of claim 2 wherein the blend contains about 90 parts by weight of poly(ethylene terephthalate), about 10 parts by weight of the liquid crystal polymer, and 2 to 5 wt. of compatibilizer calculated on the basis of the total amount of poly(ethylene terephthalate) and liquid crystal polymer.

4. The polymer blend of claim 2 wherein the blend contains about 90 parts by weight of poly(ethylene terephthalate), about 10 parts by weight of liquid crystal polymer, and 5 to 10 wt.-% of the compatibilizer calculated on the basis of the total amount of poly(ethylene terephthalate) and liquid crystal polymer.

5. The polymer blend of claim 1 wherein the polymer matrix comprises poly(ethylene terephthalate), and the liquid crystalline polymer is a copolymer of hydroxynaphthoic acid and hydroxybenzoic acid.

6. The polymer blend of claim 1 wherein the liquid crystalline polymer comprises a thermotropic polymer.

7. The polymer blend of claim 6 wherein the liquid crystalline polymer is a thermotropic polyester selected from the group consisting of poly(ester amide), poly(ester ether), poly(ester carbonate) and poly(ester imide).

8. The polymer blend of claim 1 in the form of a pipe, tube, sheet, film, or fiber.

9. The polymer blend of claim 1 wherein the matrix polymer is polyethylene.

10. The polymer blend of claim 1 wherein the matrix polymer is polypropylene.

11. A polymer blend comprising:

a matrix polymer selected from the group consisting of polyolefins, PET and PBT;

1 to 99 wt.-% of a liquid crystalline polymer wherein the liquid crystalline polymer comprises a polyester; and 0.1 to 30 wt.-% of a compatibilizer substance promoting the compatibility of the matrix polymer and the liquid crystalline polymer, the amount of the liquid crystalline polymer and the compatibilizer being calculated on the basis of the total amount of the matrix polymer and the liquid crystalline polymer, wherein the compatibility promoting substance is a reactive ethylene based terpolymer containing reactive epoxy groups, and the tensile strength and flexural strength of the blend are greater than the corresponding properties of the matrix polymer, and the Charpy impact strength of the polymer blend is at least 20% greater than that of the corresponding uncompatibilized blend.

12. The polymer blend of claim 11 wherein the matrix polymer comprises polypropylene or polyethylene.

13. The polymer blend according to claim 11 wherein the Charpy impact strength of the polymer blend is at least 30 kJ/m$^2$ determined according to the Standard ISO 179.

14. The polymer blend according to claim 11 wherein the amount of the liquid crystalline polymer is 10 to 30 wt.-% of the total amount of the matrix polymer and the liquid crystalline polymer.

15. The polymer blend of claim 11 wherein the amount of functional groups is about 0.1 to 30% of the compatibilizer.

16. The polymer blend of claim 11 wherein the polymer matrix comprises polypropylene, the liquid crystalline polymer comprises a copolymer of hydroxynaphthoic acid and hydroxybenzoic acid and the compatibilizer comprises an ethylene terpolymer with glycidyl methacrylate groups as reactive groups.

17. The polymer blend of claim 16 wherein the blend contains about 70 parts by weight of polypropylene, about 30 parts by weight of the liquid crystal polymer and 5 to 10 wt.-% of the compatibilizer, calculated on the basis of the total amount of polypropylene and liquid crystal polymer, or about 90 parts by weight of polypropylene, about 10 parts by weight of liquid crystal polymer, and 2 to 5 wt.-% of compatibilizer calculated on the basis of the total weight of polypropylene and liquid crystal polymer.

* * * * *